May 22, 1951  C. H. MARTIN  2,553,826
HYDRAULIC POWER TRANSMISSION FOR USE WITH ROTATABLE
ENGINE DRIVEN POWER TAKE-OFF SHAFTS
Filed Feb. 15, 1947  2 Sheets-Sheet 2

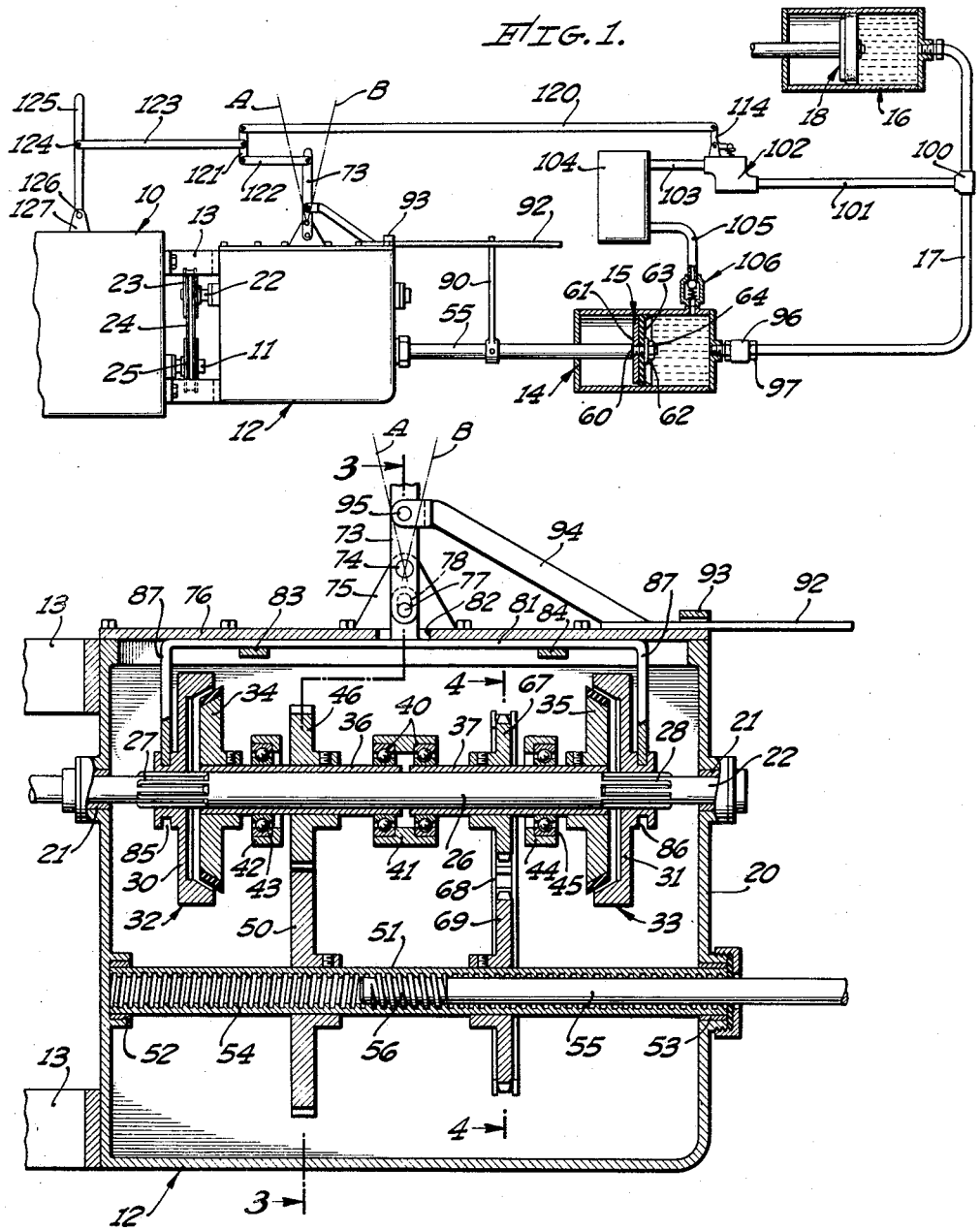

CHARLES H. MARTIN,
INVENTOR

BY *Ernest J. Lilly*
ATTORNEY.

Patented May 22, 1951

2,553,826

UNITED STATES PATENT OFFICE 2,553,826

HYDRAULIC POWER TRANSMISSION FOR USE WITH ROTATABLE ENGINE-DRIVEN POWER TAKE-OFF SHAFTS

Charles H. Martin, Huntington Park, Calif., assignor, by mesne assignments, to Farm-Aid Implement Company, Norwalk, Calif., a corporation of California Application February 15, 1947, Serial No. 728,815

2 Claims. (Cl. 60—54.5)

The present invention relates generally to hydraulic power transmission devices, and more particularly to a device which is adapted to be mounted on an automotive vehicle having ground working implements connected thereto, and which provides a means for converting the power of an engine-driven rotating shaft into hydraulic power and then utilizing such hydraulic power to actuate a remote power lift on the implement. Specifically, the present invention was designed for use on the small, four-wheel drive, personnel carrying vehicle developed for the military services and known popularly as the "jeep." Because of its light weight, four-wheel drive, and generally rugged construction, the jeep has been found to be ideally suited for use on small farms as a utility vehicle, and is extensively employed as a tractor to pull ground working implements of all kinds. The versatility of the postwar jeep has been enhanced still further by the addition of an engine-driven power take-off shaft, making it possible to drive equipment such as saws, threshers, hammermills, air compressors, and the like. There is one shortcoming of the jeep, however, and that is its lack of any provision for the actuation of hydraulic power lift equipment on the implement. As a result, implements designed for the jeep have generally been limited to manually operated lifting levers or mechanical lifts utilizing wheel-driven half-revolution clutches, neither of which is as satisfactory for certain classes of equipment as the hydraulic power lift.

One of the principal objects of the present invention, therefore, is to provide a new and improved hydraulic power transmission device adapted to be mounted on a propelling vehicle and driven by the engine thereof to provide a source of fluid pressure for actuating hydraulic equipment on the vehicle or implement.

Another important object of the invention is to provide a self-contained power lift mechanism which is adapted to be driven from the power take-off shaft of a jeep or other automotive vehicle, and which requires no structural alteration of the vehicle or its transmission system.

Another object of the invention is to provide a device for generating fluid pressure, in which the fluid is acted upon only during the power stroke and is not constantly circulated with resultant loss of power, as in prior devices.

A further object of the invention is to provide a device of the class described in which the generation of fluid pressure for the power stroke is started or stopped by engaging or disengaging a clutch, thereby eliminating the need for the usual valves.

Another object is to provide a hydraulic power transmission device in which the generation of pressure is automatically stopped and held at the end of the power stroke so that the system is protected against the development of excessive pressures without relying on pressure relief by-pass valves.

Still another object of the invention is the provision of a hydraulic power lift device embodying means whereby the implements may be dropped quickly to ground-working position.

These objects are achieved in the present invention by the provision of a reversible gear transmission which is adapted to be connected to the power take-off shaft to be driven thereby and which is operative to drive a piston axially within a master cylinder to displace fluid contained therein. The displaced fluid is conveyed through a line to the working cylinder of a remote hydraulic power lift or other operating mechanism to actuate the same, and operation of the device is accomplished by engaging one of two clutches to drive the piston in one direction or the other. A valve is provided in the system for by-passing hydraulic fluid from the working cylinder to a reservoir tank when it is desired to drop the implements quickly to ground-working position. In this way, fluid in the working cylinder can be displaced more rapidly by the piston than if it were drawn off by the master cylinder, thereby permitting a fast return of the working piston with a correspondingly quick drop of the implements carried thereby. The fluid in the reservoir tank is then drawn into the master cylinder through a check valve.

The above and other objects and advantages of the invention will become apparent to those skilled in the art upon consideration of the following detailed description of the preferred embodiment thereof, reference being had to the drawings in which:

Figure 1 is a partially sectioned schematic drawing of a hydraulic power transmission mechanism embodying the principles of the invention;

Figure 2 is an enlarged vertical section, taken through the gear box of the same;

Figure 3:
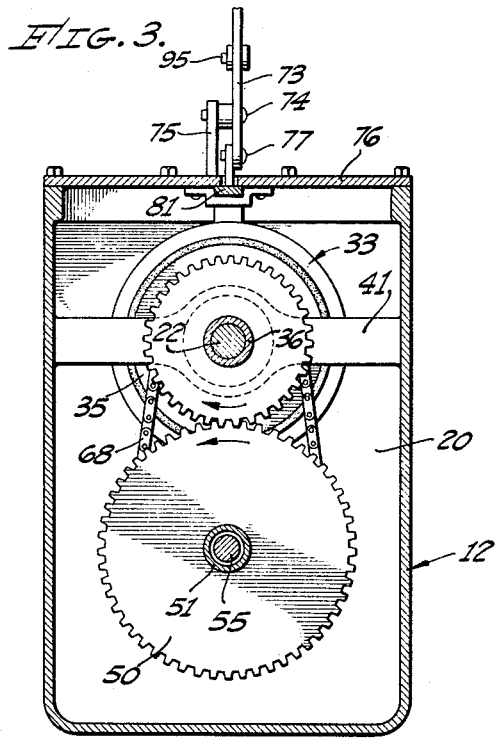
Figure 3 is a sectional view, taken along the line 3—3 of Figure 2.
Figure 6:
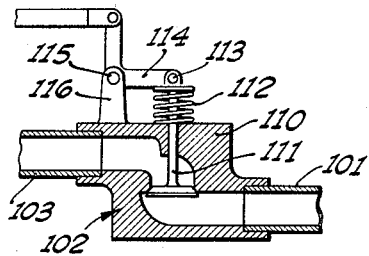
Figure 6 is an enlarged sectional view of the valve which is connected to the fluid line and which permits the implements to drop quickly to their operative, ground-working position.
Figure 4:
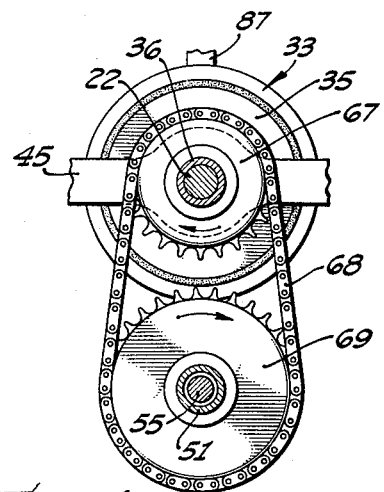
Figure 4 is a sectional view taken along the line 4—4 of Figure 2.
Figure 5:
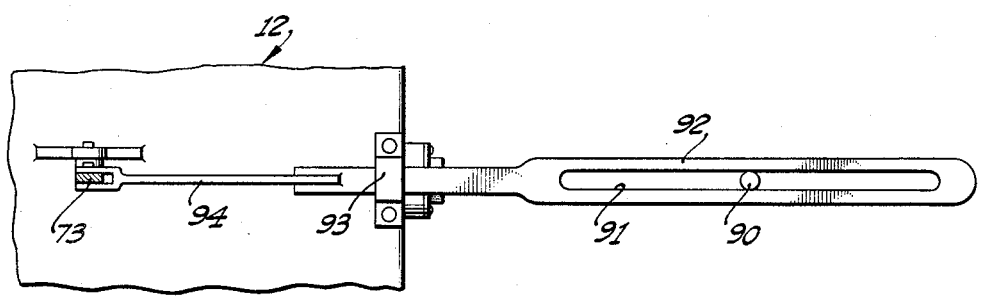
Figure 5 is a fragmentary top plan view of the linkage arrangement for stopping the operation of the device at the end of the power stroke.

In the drawings, the rear end of the body of the vehicle to which the device is attached is designated by the reference numeral 10, and projecting rearwardly therefrom is a splined power take-off shaft 11 which is driven from the engine of the vehicle. The hydraulic power transmission device of the invention comprises a gear box 12 which is adapted to be mounted on the vehicle body 10 by brackets 13; a master cylinder 14 having a piston 15 connected to the gearing in the box 12 to be moved thereby; and a working cylinder 16 which is connected by a flexible hydraulic line 17 to the master cylinder. A piston 18 in the cylinder 16 is operatively connected to mechanism on the implement (not shown) to actuate the same.

The gear box 12 includes a generally rectangular housing 20 having bushings 21 at opposite ends thereof, which serve as journals for a shaft 22. The shaft 22 projects forwardly through the front wall of the housing 20 and has a sprocket 23 fixed to its outer end, which is connected by a chain 24 to a drive sprocket 25 mounted on the splined power take-off shaft 11. Between the two bushings 21, the shaft 22 is enlarged in diameter at 26 and splined at 27 and 28 to receive the correspondingly splined hubs of the driving members 30 and 31 of clutches 32 and 33, respectively. The two clutches 32, 33 are shown illustratively as cone clutches, but it will be understood, of course, that any other form of clutch might be used with equal advantage. The clutch driving members 30, 31 are slidable on their splines 27, 28 for movement into and out of engagement with driven members 34 and 35 which are fixedly mounted on torque tubes 36 and 37. The torque tubes 36, 37 are rotatably mounted end to end on the enlarged portion 26 of the shaft, and are supported at their adjacent ends in ball bearings 40 which are held in a common bearing support member 41 extending transversely across the housing 20 from one wall to the other. The front torque tube 36 is additionally supported by a ball bearing 42 mounted in a support member 43, while the rear torque tube 37 is held by a ball bearing 44 mounted in a support member 45.

Fixedly mounted on the front torque tube 36 between the bearings 40 and 42 is a gear 46 which meshes with a companionate gear 50 mounted on a tubular shaft 51 disposed below the shaft 26 and parallel thereto. The tubular shaft 51 is journaled at its ends in bushings 52 and 53 which are mounted in the end walls of the housing 20, and is provided with an internal thread 54 extending from one end to the other. Slidably disposed within the tube 51 and projecting from the rear end thereof is a rod 55 having raised threads 56 at its inner end which mesh with the threads 54 of the tube. The rear end of the rod 55 extends into the master cylinder 14 and is provided with a threaded stud 60 of reduced diameter. A circular plate 61 is mounted on the stud 60 abutting against the shoulder formed at the junction of the stud with the rod, and clamped between the plate 61 and a washer 62 is a cup 63 of leather or rubber, having a rearwardly directed annular flange which bears against the inside wall of the cylinder. A nut 64 is threaded on the stud 61 and serves to draw the washer 62 tight against the cup.

The rear torque tube 37 has a driving sprocket 67 fixed thereto between the bearings 40 and 44, said sprocket being connected by a chain 68 to a driven sprocket 69 mounted on the tube 51. The purpose of the sprocket drive 67, 68, 69 is to drive the tube 51 in one direction from the torque tube 37, while the gears 46, 50 serve to drive the tube 51 in the other direction from the front torque tube 36, both torque tubes being rotatable in the same direction when connected with the shaft 26 through their respective clutches 34 and 35. Thus the piston 15 can be driven toward the rear end of the master cylinder 14 by engaging one of the clutches 34, 35 to rotate the tube 51 in one direction, or toward the front end of the master cylinder by engaging the other clutch. Rearward movement of the piston 15 causes a positive displacement of the fluid contained in the rear end of the master cylinder 14, and this displaced fluid is transmitted through the line 17 to the right hand end of the working cylinder 16 to drive the piston 18 forwardly. Since the working cylinder 16 is usually connected to a power lift and is therefore loaded in one direction only, it is not necessary to provide for the application of fluid pressure to the opposite side of the piston to return the same to the right hand end of the cylinder 16. Fluid in the right hand end of the working cylinder 16 is placed under pressure from the load applied on the piston 18 by the weight of the raised tools, and is forced back through the line 17 as the master cylinder piston 15 is moved to the left. If it should be desirable to have a two-way power stroke of the working piston 18, it is necessary only to provide another line connecting the left hand end of the master cylinder 14 with the left hand end of the working cylinder 16; add another cup to each of the pistons facing toward the left so that the pistons will hold pressure from either direction; and fill both sides of both cylinders with hydraulic fluid.

Selective engagement of the clutches 30, 31 is effected through a lever 73 which is pivoted at 74 on an upstanding bracket 75 on the top cover plate 76 of the housing 20. At its bottom end, the lever 73 is provided with a pin 77 which passes through an elongated slot 78 formed in a bracket 80 fixed to a bar 81. The bar 81 is disposed on the inside of the housing 20 and the bracket 80 projects upwardly therefrom through a slot 82 in the cover plate. The bar 81 is slidably held against the bottom surface of the plate 76 by two longitudinally spaced guide brackets 83 and 84, and the ends of the bar are bent downwardly and provided with forks 87 which engage annular grooves 85 and 86 in the clutch driving members 30, 31, respectively. Thus, when the lever 73 is shifted forwardly to the position indicated in dot-dash lines at A, the bar 81 is moved rearwardly, engaging the driving member 30 of clutch 32 with its driven member 34, while at the same time, the driving member 31 of clutch 33 is separated still further from its driven member. With the clutch 32 thus engaged, power from the shaft 26 is transmitted to the front torque tube 36 and through gears 46, 50 to drive the tube 51 in one direction, causing the rod 55 to be moved to the right, or left, depending upon the direction of rotation of the shaft 26 and the lead of threads 54. When the lever 73 is swung rearwardly to the position indicated at B, however, the driving member 31 of clutch 33 is engaged with its driven member 35, while the driving member 30 of clutch 32 is separated from its driven member 34. In this condition, power from the shaft 26 is transmitted through clutch 33 to the rear torque tube 37 and thence through sprockets 67 and 69 to the tube 51. Since the sprocket 69 turns in the same direction as sprocket 67, whereas gear 50 turns in the opposite direction to gear 46, rotation of the tube 51 when driven by the sprockets is in the opposite direction to that when driven by the gears. With the tube 51 thus turning in the other direction, the rod 55 is moved in the opposite direction to that traveled when the drive is through the gears.

In order to prevent the rod 55 from turning with the tube 51, an arm 90 is fixedly mounted on the rod 55 between the housing 20 and master cylinder 14 and projects upwardly therefrom. The top end of the rod passes through an elongated slot 91 formed in a rearwardly projecting bar 92 slidably mounted on the top surface of the cover plate 76 parallel to the rod 55. The bar 92 is slidably held by a guide bracket 93 fixed to the top surface of the plate 76 at its rear edge, and projecting upwardly and forwardly from the front end of the bar 92 is an arm 94 which is connected by a pin 95 to the lever 73 above the pivot pin 74.

In the illustrative form of the invention shown, the rod 55 is caused to move to the right when the lever 73 is shifted to position A, and as the master cylinder piston 15 approaches the end of its travel in this direction, the arm 90 engages the right hand end of the slot 91 in bar 92. At this point the lever 73 is picked up by the arm 90 and shifted forwardly to its center neutral position, disengaging clutch 32 which, as pointed out previously, is engaged when the lever is at position A. With the power to the tubular drive shaft 51 thus cut off, piston 15 comes to a stop and there is no further displacement of fluid from the right hand end of the master cylinder 14.

Since the arm 90 is now engaged by the right hand end of the slot 91, the lever 73 is prevented from moving to the left or back toward position A, and the only direction of control movement available is toward position B. When the lever is swung over to position B, clutch 33 is engaged, moving the rod 55 and piston 15 to the left. As the piston 15 approaches the end of its travel in this direction, the arm 90 engages the left hand end of slot 91 and moves the lever 73 back to neutral position again to disengage the clutch and bring the piston 15 to a stop. The pitch of the threads 54 is such that the driving connection between tube 51 and rod 55 is irreversible in nature, and no amount of thrust by the piston 15 on rod 55 will produce rotation of the tube 51.

A by-pass arrangement is provided to permit the fast return of the working piston 18 to the right hand end of the cylinder 16 so that implements may be dropped quicly from raised position to ground-working position. The function of this by-pass arrangement is to provide means for receiving the entire volume of fluid displaced from the right hand end of the working cylinder by the implement-loaded piston and holding the fluid until the same has been drawn into the master cylinder 14 by the relatively slow-moving piston 15. Accordingly, the by-pass includes a T-connection 100 which is connected into the line 17 and which has a branch line 101 leading to a valve 102. A line 103 extends from the valve 102 to the upper end of a reservoir tank 104, with which it is connected. Another line 105 is connected to the lower end of the tank 104 and to the right hand end of the master cylinder 14 through a check valve 106.

The valve 102 may be of any desired type, and is shown typically as comprising a housing 110 having fluid passages provided therein which communicate with the lines 101 and 103. Slidably disposed within the housing is a valve poppet 111 which is yieldingly held onto its seat by a spring 112. At its upper end, the stem of the valve poppet 111 is connected by a pin 113 to one arm of a bell-crank 114 which is pivoted at 115 on a bracket 116 on the valve housing. The upwardly extending other arm of the bell crank is connected to a push-pull rod 120 which extends forwardly therefrom and is connected to one end of an equalizer bar 121. The other end of the equalizer bar is connected by a link 122 to the clutch lever 73. Pivotally connected to the equalizer bar 121 between the rod 120 and link 122 is a forwardly extending link 123 which is connected at its front end by a pin 124 to a manually operable control handle 125 pivoted at 126 on a bracket 127 mounted on the vehicle body 10.

The linkage arrangement described above enables the operator to shift the clutch lever 73 back to position B and simultaneously open the valve 102 by merely moving the one control handle 125 rearwardly. The equalizer bar 121 distributes the control movement of the handle 125 between the clutch lever 73 and valve-actuating bell crank 114 according to their respective needs. and takes care of the difference in their operational movement. With the lever 73 moved back to position B, the forward clutch 32 is engaged, causing the piston 15 to begin its relatively slow travel toward the left. At the same time, however, the simultaneous opening of the valve 102 permits fluid from the working cylinder 16 to empty rapidly into the reservoir tank 104 under the pressure exerted by the implement-loaded piston 18, and as a result the implements are dropped quickly to ground-engaging position. The fluid discharged into the reservoir tank 104 is then drawn into the master cylinder 14 through the line 105 and check valve 106 by the slow-moving piston 15 until the latter reaches the end of its travel.

When the control handle 125 is pulled forwardly, the lever 73 is shifted to position A to drive the piston 15 rearwardly. Since the valve poppet 111 is normally seated, the bell crank 114 is prevented from rocking in a counterclockwise direction, and the rod 120 is therefore held stationary. During rearward movement of the piston 15, fluid from the master cylinder is prevented from discharging into the reservoir tank 104 by the check valve 106.

The operation and advantages of the present invention are believed to be self-evident from the foregoing discussion. Since the fluid in the master cylinder 14 is acted upon only during the power stroke when one of the clutches 32, 33 is engaged, there is no loss of power from constant circulation of the fluid as in prior devices. The device may be used in one form as a self-contained hydraulic power transmission mechanism in which the gear box 12, master cylinder 14, and working cylinder 16 are all integrally mounted on an implement and the only connection with the vehicle is to the power take-off shaft 11 by the sprockets 23, 25 and chain 24. Alternatively, the device may be used in another manner as a source of fluid pressure for working cylinders mounted on several different implements, and in this case the gear box 12 and master cylinder 14 would be mounted on the vehicle more or less permanently and removed therefrom only when required by convenience. When the device is to be used in this manner, a quick detachable fluid line coupling 96 may be provided at the discharge end of the master cylinder 14 to receive a coupling member 97 on the line 17, so that the line may be quickly and easily connected to the master cylinder. Such a coupling should preferably be of the type employing a double check valve to prevent loss of fluid from either the cylinder 14 or line 17 when the latter is disconnected.

While I have shown and described in some detail what I consider to be the preferred form of my invention, it is to be understood that changes may be made in the shape and arrangement of the several parts without departing from the broad scope of the invention as defined in the appended claims.

I claim:

1. A hydraulic power lift device for use with a vehicle adapted to have ground-working implements mounted thereon for movement between raised and lowered positions, and said vehicle having an engine-driven power take-off shaft, said power lift device comprising a master cylinder and piston, a working cylinder and piston, reversible transmission means operatively connected with said power take-off shaft for driving the piston in said master cylinder from one end thereof to the other, a hydraulic line connecting one end of said master cylinder with one end of said working cylinder whereby fluid displaced by the movement of the piston in the master cylinder is conveyed to the working cylinder to move the piston therein, said working piston being adapted to be connected to said implements to raise or lower the same, a reservoir tank connected to said hydraulic line, valve means operative to by-pass fluid from said working cylinder to said reservoir tank to permit the fast return of the implement-loaded working piston, and a check-valve controlled return line from said reservoir tank to said master cylinder, said master cylinder drawing fluid from said reservoir tank until the piston has reached the end of its return travel.

2. A hydraulic power lift device for use with a vehicle adapted to have ground-working implements mounted thereon for movement between raised and lowered positions, and said vehicle having an engine-driven power take-off shaft, said power lift device comprising a master cylinder and piston, a working cylinder and piston, a reversible drive mechanism operatively connected with said power take-off shaft, a screw threaded member supported for rotation, a rod connected at one end to the piston in said master cylinder and having threaded connection with said screw member, whereby said piston may be driven in one direction or the other within the master cylinder, a hydraulic line connecting one end of said master cylinder with one end of said working cylinder whereby fluid displaced by the movement of the piston in the master cylinder is conveyed to the working cylinder to move the piston therein, said working piston being adapted to be connected to said implements to raise or lower the same, a reservoir tank, valve means for by-passing fluid from said hydraulic line to said reservoir tank to permit the fast return of the implement-loaded working piston, a check-valve controlled return line from said reservoir tank to said master cylinder, said master cylinder drawing fluid from said reservoir tank until the piston has reached the end of its return travel, and control means operatively connected to both said reversible drive mechanism and to said valve means whereby said master cylinder piston is started on its return stroke and said valve means is simultaneously opened.

CHARLES H. MARTIN.

REFERENCES CITED

The following references are of record in the file of this patent:

UNITED STATES PATENTS

| Number | Name | Date |
|---|---|---|
| 865,201 | Morton | Sept. 3, 1907 |
| 1,439,304 | Fraser | Dec. 19, 1922 |
| 1,754,688 | McFarlane | Apr. 15, 1930 |
| 1,886,936 | Bowen | Nov. 8, 1932 |
| 1,983,884 | Hele-Shaw | Dec. 11, 1934 |
| 2,252,482 | Gates | Aug. 12, 1941 |
| 2,322,133 | Hettelsater | June 15, 1943 |
| 2,361,326 | Silver | Oct. 24, 1944 |
| 2,433,990 | Hardy | Jan. 6, 1948 |
| 2,481,477 | Peery | Sept. 6, 1949 |
| 2,487,699 | Fiegel | Nov. 8, 1949 |

FOREIGN PATENTS

| Number | Country | Date |
|---|---|---|
| 41,164 | Denmark | Nov. 16, 1929 |
| 440,087 | Germany | Jan. 28, 1927 |